US009698448B2

(12) United States Patent
Burrell et al.

(10) Patent No.: US 9,698,448 B2
(45) Date of Patent: Jul. 4, 2017

(54) ELECTROLYTES FOR MAGNESIUM ELECTROCHEMICAL CELLS

(71) Applicant: UChicago Argonne, LLC, Chicago, IL (US)

(72) Inventors: Anthony K. Burrell, Naperville, IL (US); Niya Sa, Downers Grove, IL (US); Danielle Lee Proffit, Lemont, IL (US); Albert Lipson, Forest Park, IL (US); Chen Liao, Willowbrook, IL (US); John T. Vaughey, Elmhurst, IL (US); Brian J. Ingram, Chicago, IL (US)

(73) Assignee: UCHICAGO ARGONNE, LLC, Chicago, IL (US)

( * ) Notice: Subject to any disclaimer, the term of this patent is extended or adjusted under 35 U.S.C. 154(b) by 0 days.

(21) Appl. No.: 14/690,961

(22) Filed: Apr. 20, 2015

(65) Prior Publication Data

US 2016/0308248 A1    Oct. 20, 2016

(51) Int. Cl.
    *H01M 10/54*      (2006.01)
    *H01M 10/0569*   (2010.01)
    *H01M 10/0568*   (2010.01)
    *H01M 10/054*     (2010.01)
    *H01M 4/485*       (2010.01)

(52) U.S. Cl.
    CPC ....... *H01M 10/0569* (2013.01); *H01M 4/485* (2013.01); *H01M 10/054* (2013.01); *H01M 10/0568* (2013.01)

(58) Field of Classification Search
    None
    See application file for complete search history.

(56) References Cited

U.S. PATENT DOCUMENTS

| 2013/0252112 | A1  | 9/2013  | Doe et al. |
| 2013/0260238 | A1  | 10/2013 | Doe et al. |
| 2014/0141324 | A1  | 5/2014  | Chung et al. |
| 2014/0220450 | A1* | 8/2014  | Jilek ............... H01M 10/0568 429/300 |
| 2015/0140450 | A1* | 5/2015  | Roy ................. H01M 10/0566 429/338 |

OTHER PUBLICATIONS

Aurbach et al., "Prototype systems for rechargeable magnesium batteries", Nature, 2000, vol. 407, pp. 724-727.
Benmayza, et al., "Effect of Electrolytic Properties of a Magnesium Organohaloaluminate Electrolyte on Magnesium Deposition", J. Phys. Chem. C, 2013, vol. 117, pp. 26881-26888.
Chusid, et al., "Solid-State Rechargeable Magnesium Batteries", Adv. Mater., 2003, vol. 15, No. 7-8, pp. 627-630.
Doe, et al., "Novel, electrolyte solutions comprising fully inorganic salts with high anodic stability for rechargeable magnesium batteries", Chem. Commun., 2014, vol. 50, pp. 243-245.
Giorgetti et al., "In Situ X-Ray Absorption Spectroscopy Characterization of V2O5 Xerogel Cathodes upon Lithium Intercalation", J. Electrochem. Soc., 1999, vol. 146, No. 7, pp. 2387-2392.
Guo et al., "Boron-based electrolyte solutions with wide electrochemical windows for rechargeable magnesium batteries", Energy Environ. Sci., 2012, vol. 5, pp. 9100-9106.
Ha et al., "Magnesium(II) Bis(trifluoromethane sulfonyl) Imide-Based Electrolytes with Wide Electrochemical Windows for Rechargeable Magnesium Batteries", ACS Appl. Mater. Interfaces, 2014, Issue 6, pp. 4063-4073.
Jain et al., "Commentary: The Materials Project: A materials genome approach to accelerating materials innovation", Apl Materials, 2013, vol. 1, pp. 011002-1-011002-11.
Lee, et al., "The effects of cations and anions on the ionic conductivity of poly[bis(2-(2-methoxyethoxy)ethoxy)phosphazene] doped with lithium and magnesium salts of trifluoromethanesulfonate and bis(trifluoromethanesulfonyl)imidate", Solid State Ionics, 2010, vol. 181, pp. 1721-1726.
Liebenow et al., "The electrodeposition of magnesium using solutions of organomagnesium halides, amidomagnesium halides and magnesium organoborates", Electrochem. Commun., 2000, vol. 2, pp. 641-645.
Ling et al., "Study of the electrochemical deposition of Mg in the atomic level: Why it prefers the non-dendritic morphology", Electrochim. Acta, 2012, vol. 76, pp. 270-274.
Lu, et al., "On the electrochemical behavior of magnesium electrodes in polar aprotic electrolyte solutions", J. Electroanal. Chem., 1999, vol. 466, pp. 203-217.
Martin LaMonica, "Magnesium-ion batteries promise to be cheaper and more energy dense than lithium-ion ones". MIT Technology Review website http://technologyreview.com/news/507561/toyota-plugs-away-at-the-next-gen-electric-car-battery/ (Nov. 28, 2012).
Matsui, "Study on electrochemically deposited Mg metal", J. Power Sources, 2011, vol. 196, pp. 7048-7055.
McOwen et al., "Concentrated electrolytes: decrypting electrolyte properties and reassessing Al corrosion mechanisms", Energy Environ. Sci., 2014, vol. 7, pp. 416-426.
Mohtadi et al., "Magnesium batteries: Current state of the art, issues and future perspectives", Beilstein J. of Nanotech., 2014, vol. 5, pp. 1291-1311.
Mohtadi et al., "Magnesium Borohydride: From Hydrogen Storage to Magnesium Battery", Angew. Chem. Int'l. Ed., 2012, vol. 51, pp. 9780-9783.
Muldoon et al., "Electrolyte roadblocks to a magnesium rechargeable battery", Energy Environ. Sci., 2012, vol. 5, pp. 5941-5950.
Novak et al., "Electrochemical Insertion of Magnesium into Hydrated Vanadium Bronzes", J. Electrochem. Soc., 1995, vol. 142, No. 8, pp. 2544-2550.
Novak et al., "Magnesium insertion electrodes for rechargeable nonaqueous batteries—a competitive alternative to lithium?", Electrochim. Acta, 1999, vol. 45, pp. 351-367.

(Continued)

*Primary Examiner* — Ladan Mohaddes
(74) *Attorney, Agent, or Firm* — Foley & Lardner LLP

(57) ABSTRACT

An electrochemical cell includes a high voltage cathode configured to operate at 1.5 volts or greater; an anode including $Mg^0$; and an electrolyte including an ether solvent and a magnesium salt; wherein: a concentration of the magnesium salt in the ether is 1 M or greater.

15 Claims, 9 Drawing Sheets

(56) References Cited

OTHER PUBLICATIONS

Orsini et al., "In situ Scanning Electron Microscopy (SEM) observation of interfaces within plastic lithium batteries", J. Power Sources, 1998, vol. 76, pp. 19-29.

Perez-Flores et al., "Hollandite-type TiO2: a new negative electrode material for sodium-ion batteries", J. Mater. Chem. A, 2014, vol. 2, pp. 1825-1833.

Rajput, et al., "The Coupling between Stability and Ion Pair Formation in Magnesium Electrolytes from First-Principles Quantum Mechanics and Classical Molecular Dynamics", J. Am. Chem. Soc., 2015, vol. 137, pp. 3411-3420.

Ratnakumar, "Passive films on magnesium anodes in primary batteries", J. Appl. Electrochem., 1988, vol. 18, pp. 268-279.

Shterenberg et al., "The challenge of developing rechargeable magnesium batteries", MRS Bulletin, 2014, vol. 39, pp. 453-460.

Sutton, et al., "Vanadium K edge XANES of synthetic and natural basaltic glasses and application to microscale oxygen barometry", Geochim. Cosmochim. Acta, 2005, vol. 69, No. 9, pp. 2333-2348.

Tarascon et al., "Issues and challenges facing rechargeable lithium batteries", Nature, 2001, vol. 414, pp. 359-367.

Wen-Hai, et al., Insertion of Bi-Valence Cations Mg2+ and Zn2+ into V2O5, Solid State Commun., 1987, vol. 61, No. 5, pp. 271-273.

Wong et al., "K-edge absorption spectra of selected vanadium compounds", Physical Review B, 1984, vol. 30, No. 10, pp. 5596-5610.

Yoni Cohen, "A Magnesium Battery? Khosla ARPA-E Explore Lithium Alternative", Greentech Media website http://www.greentechmedia.com/articles/read/a-magnesium-battery-khosla-arpa-e-explore-lithium-alternative (accessed May 17, 2003).

Yoo et al., "Mg rechargeable batteries: an on-going challenge", Energy Environ. Sci., 2013, vol. 6, pp. 2265-2279.

Yoshida et al., "Oxidative-Stability Enhancement and Charge Transport Mechanism in Glyme-Lithium Salt Equimolar Complexes", J. Am. Chem. Soc., 2011, vol. 133, pp. 13121-13129.

Yu et al., "Intercalation of Mg IN V2O5", Solid State Commun., 1987, vol. 63, No. 11, pp. 1043-1044.

Yu, et al., "Electrochemical insertion of magnesium ions into V2O5 from aprotic electrolytes with varied water content", J. Colloid Interface Sci., 2004, vol. 278, pp. 160-165.

* cited by examiner

FIG. 1A
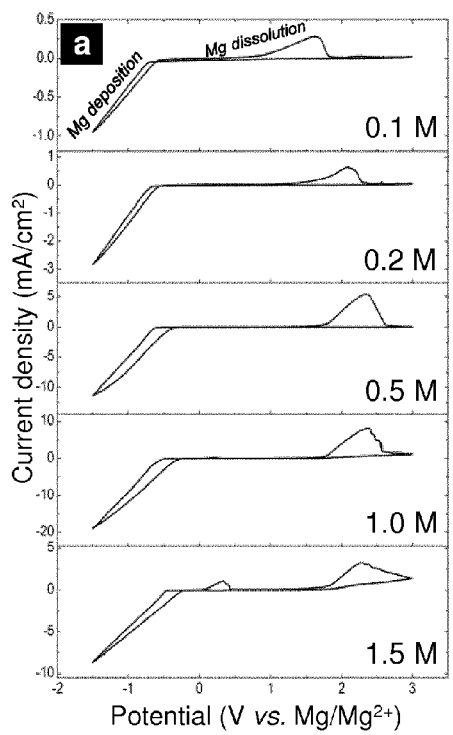
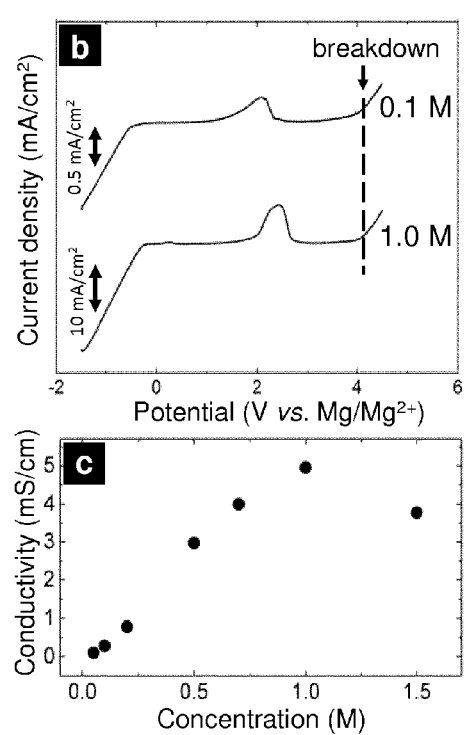
FIG. 1B
FIG. 1C

FIG. 3A
FIG. 3B
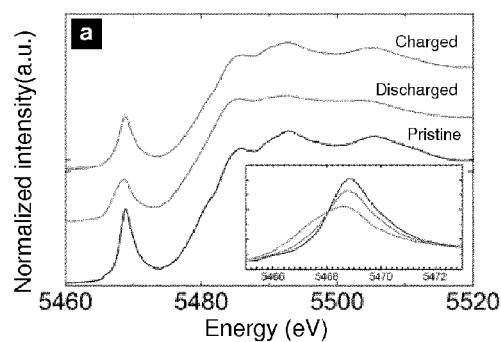
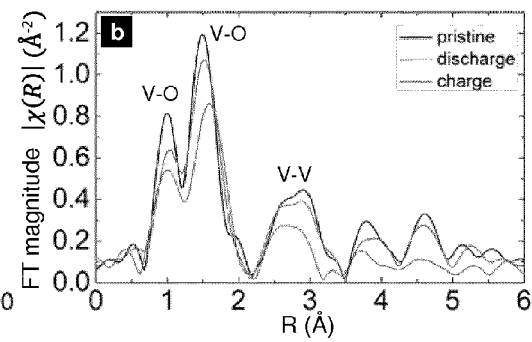

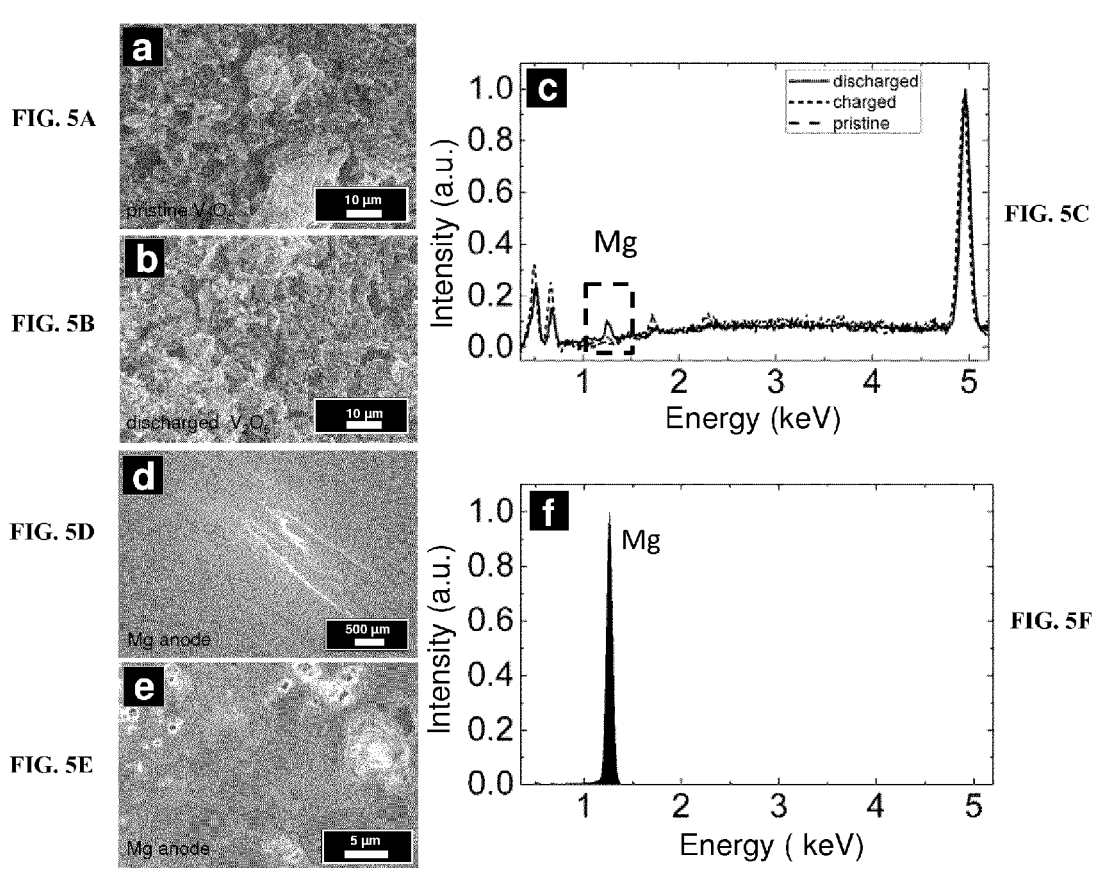

FIG. 8A
FIG. 8B
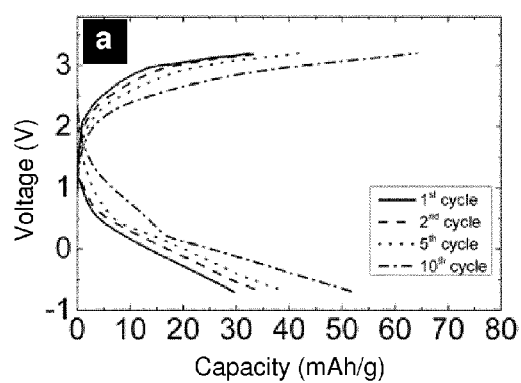
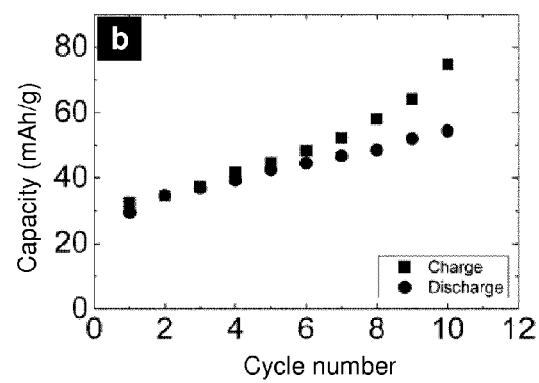

US 9,698,448 B2

ELECTROLYTES FOR MAGNESIUM ELECTROCHEMICAL CELLS

GOVERNMENT RIGHTS STATEMENT

The United States Government has rights in this invention pursuant to Contract No. DE-AC02-06CH11357 between the U.S. Department of Energy and UChicago Argonne, LLC, representing Argonne National Laboratory.

FIELD

The present technology is generally related to magnesium batteries. In particular, the technology is related to electrolytes for magnesium batteries.

SUMMARY

In one aspect, an electrochemical cell is provided, the cell including a high voltage cathode configured to operate at 1.5 volts or greater; an anode including $Mg^0$; and an electrolyte including an ether solvent and a magnesium salt; where a concentration of the magnesium salt in the ether is 1 M or greater. In some embodiments, the cathode may be configured to operate at 2 volts or greater. In any of the above embodiments, the cathode may be configured to operate at 3 volts are greater.

In any of the above embodiments, the concentration of the magnesium salt in the ether is from 1 M to 4 M, from 1 M to 2 M, or is about 1.5 M. In any of the above embodiments, the magnesium salt may be $Mg(N(SO_2CF_3)_2)_2$. In any of the above embodiments, the ether solvent includes tetrahydrofuran, 2-methyl tetrahydrofuran, dimethoxyethane, glyme, monoglyme, dimethyl glycol, ethylene glycol dimethyl ether, diethyl ether, ethyl glyme, diglyme, proglyme, ethyl diglyme, triglyme, butyl diglyme, tetraglyme, polyglyme, or higlyme. In any of the above embodiments, the ether may be digylme.

In any of the above embodiments, the cathode includes a metal oxide. In any of the above embodiments, the cathode may include $MnO_2$, $V_2O_5$, or $V_6O_{13}$. In some embodiments, the cathode comprises a sol-gel $V_2O_5$ cathode.

In another aspect, an electrochemical cell is provided, the cell including a high voltage cathode configured to operate at 1.5 volts or greater; an anode including $Mg^0$; and an electrolyte an ether solvent and a magnesium salt; where the magnesium salt consists of $Mg(N(SO_2CF_3)_2)_2$, and the ether solvent consists of diglyme and a concentration of the magnesium salt in the ether is 1 M or greater.

BRIEF DESCRIPTION OF THE DRAWINGS

FIG. 1(a) shows cyclic voltammograms (CV) of an $Mg(TFSI)_2$/diglyme electrolyte at concentrations from 0.1 M to 1.5 M, and the reversible deposition of magnesium, according to the examples.

FIG. 1(b) shows the results of linear sweep voltammetry (LSV) of 0.1 M $Mg(TFSI)_2$/diglyme and 1 M $Mg(TFSI)_2$/diglyme electrolytes, with a Pt disk as the working electrode, and a Mg ribbon as the reference and counter electrode for CV and LSV, according to the exmaples. The scan rate was 25 mV/sec.

FIG. 1(c) shows the concentration-dependent ionic conductivity of a $Mg(TFSI)_2$/diglyme electrolyte, according to the examples.

FIG. 3(a) shows XANES spectra for pristine, charged, and discharged $V_2O_5$ at V k-edge, according to the examples.

FIG. 3(b) shows experimental $k^2$-weighted XAS and relative FT of pristine, charged and discharged $V_2O_5$ at V k-edge, according to the examples.

FIGS. 5A-F illustrate SEM and EDX characterization of a $V_2O_5$ cathode and Mg anode: (a) SEM image of pristine $V_2O_5$; (b) SEM of discharged $V_2O_5$; (c) Corresponding characteristic Mg spectrum from EDX for discharged (black), charged (red) and pristine (blue) $V_2O_5$. The inset shows the spectra from the boxed area in offset; (d) SEMs images of the cycled Mg anode at low magnification; (e) Cycled Mg anode at high magnification; (f) Corresponding Mg spectrum from EDX of the cycled Mg anode.

FIG. 8a is a voltage vs. capacity curve for cycling for a cell having a $V_2O_5$ cathode, a magnesium anode, and an electrolyte of $Mg(TFSI)_2$ in diglyme, and FIG. 8b illustrates the capacity profile over cycling, according to the exmaples.

DETAILED DESCRIPTION

Figure 2A:
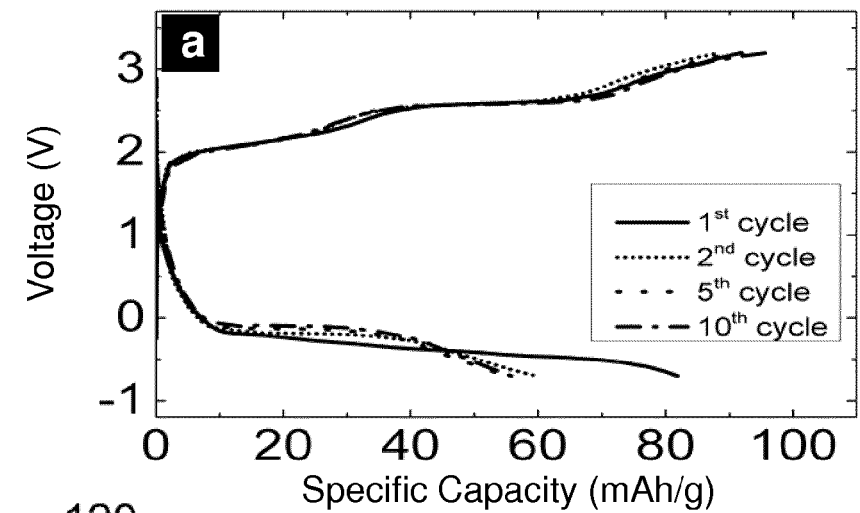
FIG. 2(a) is a graph illustrating galvanostatic coin cell cycling of $V_2O_5$ with a Mg disk at constant current mode (20 µA) for discharge-charge curves for the first 10 cycles, according to the examples.

Various embodiments are described hereinafter. It should be noted that the specific embodiments are not intended as an exhaustive description or as a limitation to the broader aspects discussed herein. One aspect described in conjunction with a particular embodiment is not necessarily limited to that embodiment and may be practiced with any other embodiment(s).

As used herein, "about" will be understood by persons of ordinary skill in the art and will vary to some extent depending upon the context in which it is used. If there are uses of the term which are not clear to persons of ordinary skill in the art, given the context in which it is used, "about" will mean up to plus or minus 10% of the particular term.

The use of the terms "a" and "an" and "the" and similar referents in the context of describing the elements (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein may be performed in any suitable order unless otherwise indicated herein or otherwise clearly contradicted by context. The use of any and all examples, or exemplary language (e.g., "such as") provided herein, is intended merely to better illuminate the embodiments and does not pose a limitation on the scope of the claims unless otherwise stated. No language in the specification should be construed as indicating any non-claimed element as essential.

In one aspect an electrolyte is provided for a high voltage magnesium ion battery having a magnesium metal anode. The electrolytes provide for reversible deposition of magnesium, and which is compatible with high voltage cathode active materials. The electrolyte includes high concentrations of a magnesium salt in an ether solvent. The concentration of the magnesium salt in the ether is at least 1 M. In any such embodiments, the concentration may be from about 1.5 M to about 4 M. In any of the above embodiments, the concentration may be from about 1 M to about 2 M. In any such embodiments, the concentration may be about 1.5 M.

As an anode, magnesium has a low reduction potential (−2.37 V versus the standard hydrogen electrode (SHE) and a high theoretical volumetric capacity (3832 mAh/cm$^3$), and it is a non-dendrite-forming material upon Mg deposition. Due to the 2+ charge on the ion, magnesium anodes have the potential to achieve high theoretical volumetric capacity. Magnesium batteries can theoretically run on mere deposition and dissolution of ions into and out of the metal surface, thereby avoiding issues associated with solid diffusion.

Illustrative magnesium salts include, but are not limited to, $Mg[B(C_2O_4)_2]_2$; $Mg[BF_2(C_2O_4)]_2$; $Mg(ClO_4)_2$, $Mg(BF_4)_2$; $Mg(PF_6)_2$; $Mg(AsF_6)_2$; $Mg(SbF_6)_2$; $MgBr_2$; $Mg(CF_3SO_3)_2$; $Mg(CF_3SO_2)_2$; $Mg(C(CF_3SO_2)_3)_2$; $Mg(B(C_6F_5)_4)_2$; $Mg(B(C_6H_5)_4)_2$; $Mg(N(SO_2CF_3)_2)_2$; $Mg(N(SO_2CF_2CF_3)_2)_2$; $Mg(N(SO_2C_2F_5)_2)_2$; $Mg(BF_3C_2F_5)_2$; and $Mg(PF_3(CF_2CF_3)_3)_2$. In some embodiments, the magnesium salt is magnesium bistrifluoromethane sulfonamide (Mg (TFSI)$_2$).

Illustrative ether solvents include, but are not limited to, tetrahydrofuran, 2-methyl tetrahydrofuran, dimethoxyethane, glyme, monoglyme, dimethyl glycol, ethylene glycol dimethyl ether, diethyl ether, ethyl glyme, diglyme, proglyme, ethyl diglyme, triglyme, butyl diglyme, tetraglyme, polyglyme, and higlyme. Mixtures of any two or more such solvents may also be used. In some embodiments, the ether solvent is diglyme.

The electrolyte is compatible with high voltage cathode active materials in the presence of a magnesium metal anode. Illustrative high voltage cathode active materials include, but are not limited to, $MnO_2$, vanadium pentoxide ($V_2O_5$), and $V_6O_{13}$. In some embodiments, the high voltage cathode active comprises a sol-gel $V_2O_5$ cathode. As used herein, a sol-gel produces $V_2O_5$ cathode has an amorphous structure (i.e. amorphous $V_2O_5$) and wider interlayer spacing, than a non-sol gel $V_2O_5$.

As used herein, the term high voltage is applied to cathode active materials operating at voltages greater than 1.5 volts. This may include at voltages greater than 2 volts, greater than 2.5 volts, greater than 3 volts, greater than 3.5 volts, or greater than 4 volts. In some embodiments, this includes voltages from about 1.5 to 5 volts, from about 2 to 5 volts, from about 2.5 to 5 volts, or from about 3 to 5 volts.

Where the salt is Mg(TFSI)$_2$ and the cathode active material is $V_2O_5$, it has been found that plating and stripping of Mg metal can be achieved over a wide concentration range. However, reversible insertion of Mg ions into the $V_2O_5$ cathode can only be attained at high electrolyte concentrations. Reversible intercalation of Mg into $V_2O_5$ is characterized and confirmed by diffraction, X-ray absorption near edge spectroscopy, and energy dispersive spectroscopy.

The cathode may also include a current collector in communication with the cathode active material. Illustrative current collectors may be any material that is stable at the voltage of the cell and under the chemical conditions in the cell. Such materials may include, but are not limited to, stainless steel, aluminum, copper, or a carbon-based collector such as graphite.

The cathode may also include a conductive additive (such as carbon black, graphite, graphene, metal particles, or the like) to aid in electrical communication of the cathode active material with the current collector. The cathode may also include a binder to form the cathode. Illustrative binders include, but are not limited to, poly-vinylidene fluoride (PVdF), poly(vinylidene fluoride-co-hexafluoropropene) (PVdF-HFP) or polytetrafluoroethylene (PTFE).

The anode may also include a current collector in communication with the magnesium. Illustrative current collectors may be any material that is stable at the voltage of the cell and under the chemical conditions in the cell. Such materials may include, but are not limited to, stainless steel, aluminum, copper, or a carbon-based collector such as graphite.

The anode may also include a binder to aid in electrical communication of the magnesium with the current collector and to form the anode. Illustrative binders include, but are not limited to, poly-vinylidene fluoride (PVdF), poly(vinylidene fluoride-co-hexafluoropropene) (PVdF-HFP) or polytetrafluoroethylene (PTFE).

The present invention, thus generally described, will be understood more readily by reference to the following examples, which are provided by way of illustration and are not intended to be limiting of the present invention.

EXAMPLES

Preparation of Mg(TFSI)$_2$ in Diglyme

Magnesium bis(trifluoromethane sulfonyl)imide (Mg(TFSI)$_2$, 99.5%, Solvionic, France) was dried in a vacuum oven overnight before use. Diglyme (Aldrich, anhydrous, 99.5%) solvent was pretreated with molecular sieves (Aldrich, 3 Å beads, 4-8 mesh) overnight, and mixed with the dried Mg(TFSI)$_2$. The mixture was then stirred overnight to produce the electrolyte.

Preparation of Orthorhombic $V_2O_5$ Cathode.

Vanadium oxide electrodes were prepared by casting a 8:1:1 weight-ratio slurry of vanadium oxide (Fluka, >99%), Timcal Super C45 carbon black, and polyvinylidene fluoride (PVDF) dissolved in N-methyl-2-pyrrolidinone (NMP) onto a 304 stainless steel current collector. The laminates were then dried at 75° C. in oven for at least one hour before being punched as 7/16" diameter electrodes and vacuum dried.

Cyclic Voltammagram and Slow Scan Voltammetry Measurement.

A three electrode setup with a Pt disk as working electrode (2 mm in diameter, CH instruments, Austin, Tex.) and polished Mg ribbon as counter and reference electrode (99.9% purity, Sigma-Aldrich) is applied to measure the cyclic voltammagram of the electrolyte. A three electrode Swagelok cell configuration is used for slow scan voltammetry measurements, with $V_2O_5$ on stainless steel current collector as the working electrode, with a polished magnesium disk (7/16" diameter) as the counter and reference electrode. Electrochemical characterization was carried out on a multichannel potentiostat (Parstat MC, Princeton Applied Research, TN) under pure argon atmosphere in a glove box.

X-Ray Diffraction.

High-energy X-ray diffraction (XRD) experiments were carried out at sector 11-ID-C of Advanced Photon Source (APS) at Argonne National Laboratory (ANL). The wavelength of the X-rays was pre-set to 0.10804 Å (fixed wavelength for this station). High-energy X-rays at about 0.1 Å were selected for the excellent penetration capability to detect structural changes on bulk part of the sample. $V_2O_5$ powder was collected and pressed into pellets that were sealed with a Kapton tape mask. During the experiment, the high energy X-ray (115 keV), with a beam size of 0.2 mm hits the sample, and a PerkinElmer area X-ray detector was used to collect the 2-dimentional diffraction patterns in a transmission mode. The obtained 2D diffraction patterns were calibrated using a standard $CeO_2$ sample and converted to one-dimensional patterns using Fit2D software.

X-Ray Absorption Near Edge Structure (XANES).

Synchrotron radiation-based in operando x-ray absorption spectroscopy is applied to detect the change of energy at vanadium k-edge for charged and discharged cathode at beamline 20-BM-B at the Advanced Photon Source, Argonne National Lab. The measurements were carried in transmission mode with vanadium metal as reference channel which provides internal calibration for the alignment of the edge position. Coin cells with $V_2O_5$ as the cathode and Mg metal as the anode were cycled under a constant current mode, 20 μA, for 10 cycles, before holding at certain charged/discharged potentials. The $V_2O_5$ powder was then collected and mixed homogeneously with cellulose at a mass ratio of 1:5 and pressed into pellets for the measurement. The XANES spectra were normalized after removal of the background absorption with subtracting of the linear function extrapolated from the pre-edge region. Data analysis was followed through standard methods using the ATHENA software package.

Scanning Electron Microscopy (SEM) and Energy Dispersive X-Ray Spectroscopy (EDX).

Scanning electron microscopy and energy-dispersive X-ray spectroscopy characterization were performed with a Hitachi S4700-II scanning electron microscope equipped with an EDAX detector mounted at a 30° take-off angle. Elemental composition was determined using a standardless ZAF (atomic number, absorption and fluorescence) corrected analysis. Both EDX and SEM were performed at an electron energy of 30 keV. Cathode materials collected from cycled coin cells were soaked and rinsed with acetone to remove any electrolyte residue on the surface prior to the EDX analysis.

Tri- and Tetra Glyme.

Figure 9A:
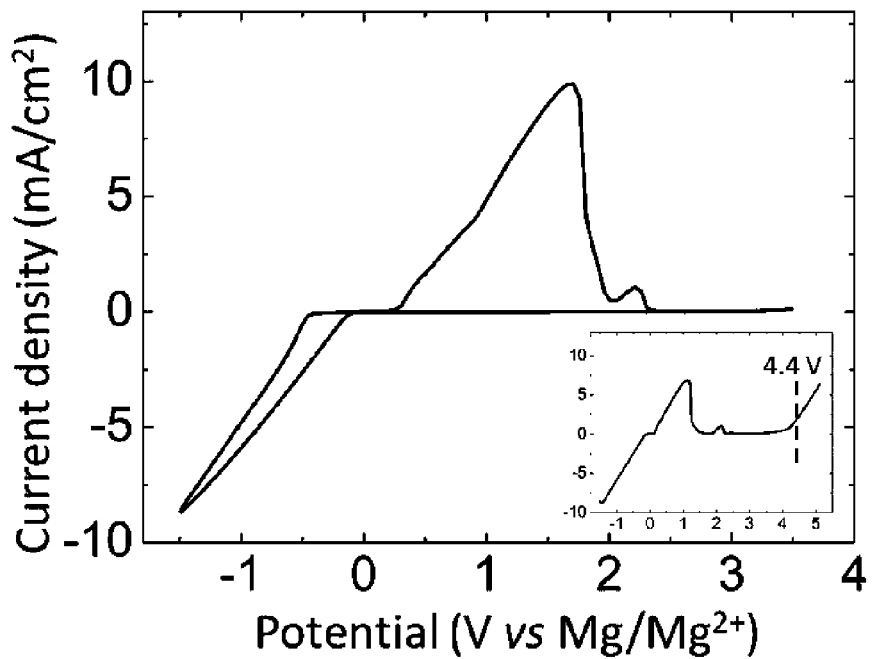
FIG. 9A is a cyclic voltammogram illustrating magnesium plating and stripping from $Mg(TFSI)_2$ in triglyme.
Figure 9B:
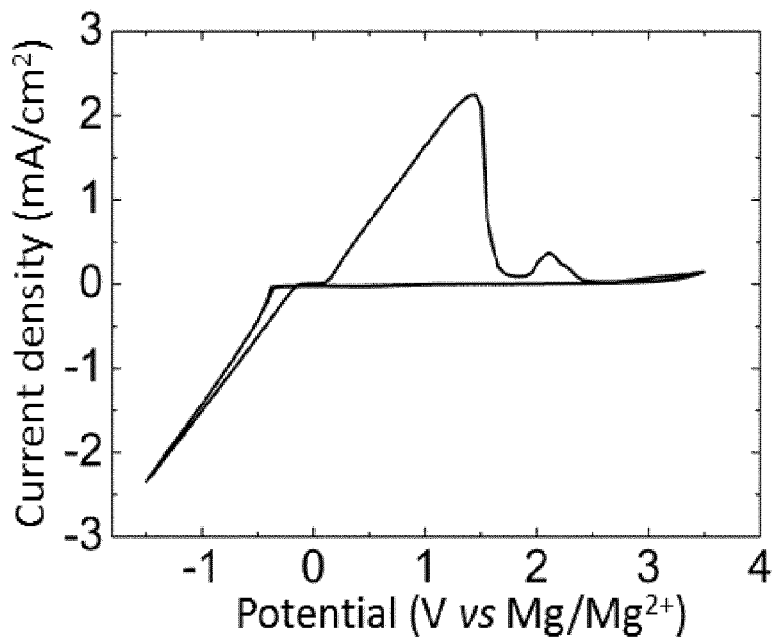
FIG. 9B is a cyclic voltammogram illustrating magnesium plating and stripping from $Mg(TFSI)_2$ in tetraglyme, according to the exmaples.

Cyclic voltammetry was also run using a $Mg(TFSI)_2$ electrolyte in triglyme or tetraglyme. The results (FIGS. 9A and B, respectively) show that magnesium metal can be plated and stripped reliably in these solvents.

Results and Discussion.

Electrochemical characterization of the $Mg(TFSI)_2$/diglyme electrolyte illustrates (1) plating and stripping of Mg can be achieved at a wide concentration range, from 0.1 M to 1.5 M; (2) anodic stability is above 4.2 V versus $Mg/Mg^{2+}$; and (3) high ionic conductivity, up to 5.2 mS/cm may be achieved.

Cyclic voltammetry was conducted on the cells to evaluate the reversibility of Mg deposition from a $Mg(TFSI)_2$/diglyme electrolyte at a magnesium anode. FIG. 1(a) shows cyclic voltammograms for $Mg(TFSI)_2$/diglyme at a Pt electrode with electrolyte concentrations from 0.1 M to 1.5 M. The results show that the current density for magnesium deposition and dissolution increases linearly as the electrolyte concentration increases from 0.1 M to 1.0 M. However, deposition/dissolution current density decreases at 1.5 M.

Without being bound by theory, it is believed that this phenomenon is possibly due to ion pair formation that lowers the total number of effective charge carriers with ligands. Interestingly, the deposition onset potential decreases as the concentration increases. For instance, the deposition onset potential is −0.57 V and −0.22 V at 0.1 M and 1.5 M, respectively. The lowered potential indicates that the Mg deposition is more energetically favorable at higher electrolyte concentrations, which is possibly due to the lowered dissolvation energy at high electrolyte concentration. On the other hand, magnesium dissolution in $Mg(TFSI)_2$/diglyme electrolytes is comparably difficult and the voltage required to extract Mg from the substrate is about 2 V more positive than the voltage needed to deposit Mg. Such an over-potential may be due to the formation of a surface layer at the $Mg(TFSI)_2$/diglyme and the Mg anode interface.

Figure 6A:
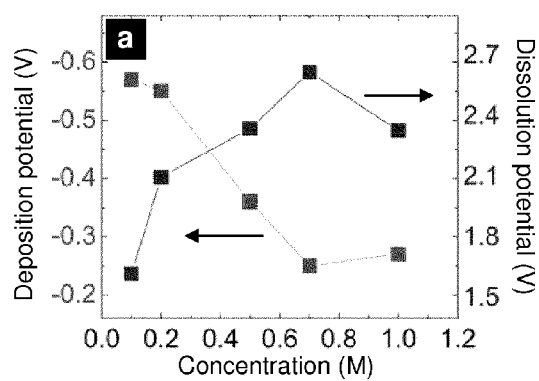
FIGS. 6A and B are graphs of (a) concentration dependence of Mg deposition and dissolution potential, and (b) columbic efficiency with $Mg(TFSI)_2$ in diglyme as a function of concentration, according to the examples.
Figure 6B:
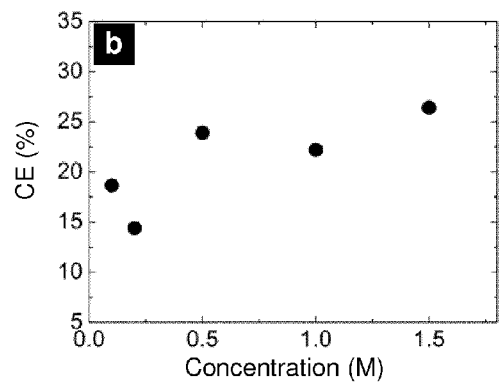

Different from complex organomagnesium-based electrolytes (i.e. Grignard electrolytes), where the strong reducing character of the materials provides nearly 100% columbic efficiency, the $Mg(TFSI)_2$/diglyme electrolyte of the above examples obtains a columbic efficiency of about 30%. FIG. 6. The working mechanism for reversible magnesium deposition in $Mg(TFSI)_2$/diglyme is not well understood at this time. However, it is believed that the diglyme solvent provides a dissociation environment for the release of Mg ions, thereby facilitating the Mg deposition and dissolution.

To evaluate the compatibility with a high voltage oxide cathode material, the anodic stability of $Mg(TFSI)_2$/diglyme was investigated. Linear sweep voltammetry (LSV) was conducted on a Pt working electrode and the oxidation onset potential of 4.2 V vs. $Mg/Mg^{2+}$ for 1 M and 0.1 M $Mg(TFSI)_2$/diglyme is as shown in FIG. 1(b), indicating a non-concentration dependent oxidation onset potential, in good agreement with the literature value. The anodic stability of $Mg(TFSI)_2$/diglyme was found to be significantly beyond that of organomagnesium electrolytes, where the best performance on magnesium metal has been reported to be 3.7 V (Muldoon, J. et al. *Environ. Sci.* 5, 5941-5950 (2012); Guo, Y-S. et al. *Energy Environ. Sci.* 5, 9100-9106 (2012)). Thus, $Mg(TFSI)_2$/diglyme is a more stable electrolyte that shows reversible magnesium and its anodic stability is concentration independent.

$Mg(TFSI)_2$/diglyme electrolytes also provide for high ionic conductivity for battery applications. The conductivity of $Mg(TFSI)_2$/diglyme was characterized by the electrochemical impedance spectroscopy and its concentration dependence is shown in FIG. 1(c). Conductivity increases with concentration and reaches its peak value, 5.2 mS/cm, at 1 M. After this point, the conductivity then decreases as the concentration continues to increase, possibly due to lowered ionic mobility. The $Mg(TFSI)_2$/diglyme displays higher conductivity than organohalide-based or organomagnesium-based electrolytes, where the highest ionic conductivity is approximately 3 mS/cm (Chusid, O. et al. *Adv. Mater.* 15, 627-630 (2003); Doe, R. E. et al. *Chem. Commun.* 50, 243-245 (2014)). Based on these findings, 1 M Mg(TFSI)$_2$/diglyme was selected for coin cell construction.

Figure 2B:
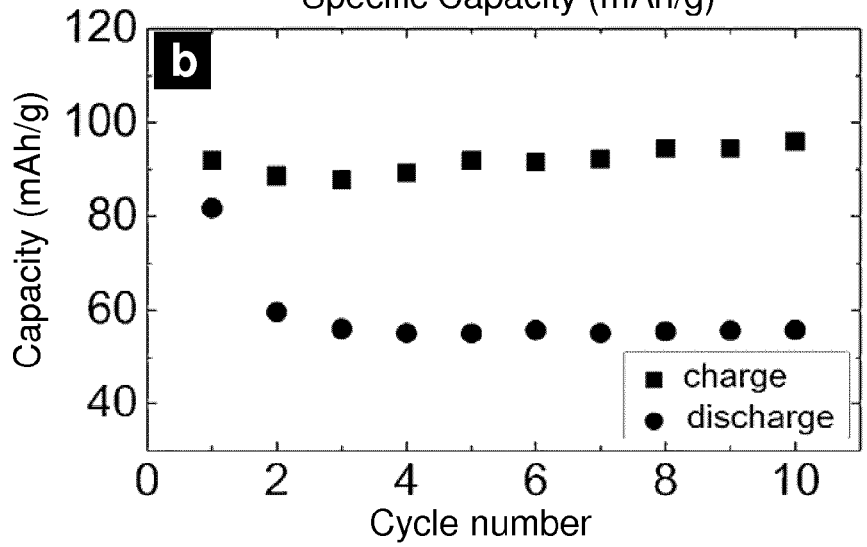
FIG. 2(b) shows the discharge and charge capacities versus cycle numbers, according to the exmaples.
Figure 2C:
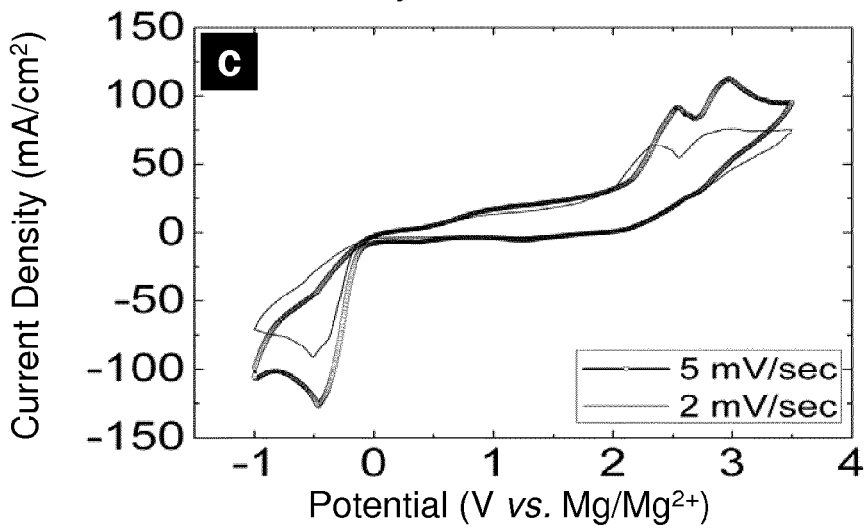
FIG. 2(c) shows slow scan rate cyclic voltammetry of $V_2O_5$ versus Mg as counter and reference electrode in a 1 M $Mg(TFSI)_2$/diglyme electrolyte at a sweep rate of 5 mV/sec and 2 mV/sec, according to the examples.

A conventional coin cell was prepared having a V$_2$O$_5$ cathode, 1 M Mg(TFSI)$_2$/diglyme electrolyte, and a magnesium metal anode. Galvanostatic cycling of the coin cell demonstrated reversible cycling behavior as shown in FIG. 2(a) with a discharge capacity of 82 mAh/g in the first cycle. A stable capacity was established from the second to tenths cycles of 56 mAh/g with a coulombic efficiency of 65%. Two voltage plateaus at 2.1 V and 2.6 V vs Mg/Mg$^{2+}$ are observed from the galvanostatic cycling. FIG. 2(b) presents the charge-discharge behavior for a Mg(TFSI)$_2$/diglyme system in terms of capacity versus cycle number. As shown, there is no significant capacity fade observed. Slow scan rate cyclic voltammograms with a three electrode setup (V$_2$O$_5$ as cathode, Mg disk as anode and counter electrode), was performed, and confirmed the two electrode coin cell cycling results. Two oxidation peaks were observed at 2.3 and 2.8 V, which falls in good agreement with the plateaus at charge-discharge curve. See FIG. 2b. A reduction peak is observed at −0.5 V, and the negative voltage is caused by film formation at the Mg anode. See FIG. 6. The large overpotential is noted during cell cycling is ascribed to the film formation at Mg anode. In addition, galvanostatic cycling of coin cell with V$_2$O$_5$ as cathode and high surface area carbon as anode was performed to confirm the consistency of the cycling performance, and similar plateaus profiles are observed. See FIG. 7.

A noteworthy finding is that a relatively high electrolyte concentration is required in order for the intercalation/deintercalation reaction to occur at the cathode side. Mg(TFSI)$_2$/diglyme at low concentration results a cell failure before it reaches to a high charge potential. See FIG. 6. However, the cell can survive at high electrolyte concentrations, for instance at 1 M and 1.5 M. There are two possible explanations for this phenomena. The first is that at high concentrations, Mg(TFSI)$_2$ is well-ionized to lower the dissociation energy, such that that oxidation of the uncoordinated solvent will be eliminated. Another possible explanation is that the lowered polarization effect occurs at the electrolyte cathode interface at high electrolyte concentration, and as a result facilitates the solid diffusion into the cathode material.

Figure 4:
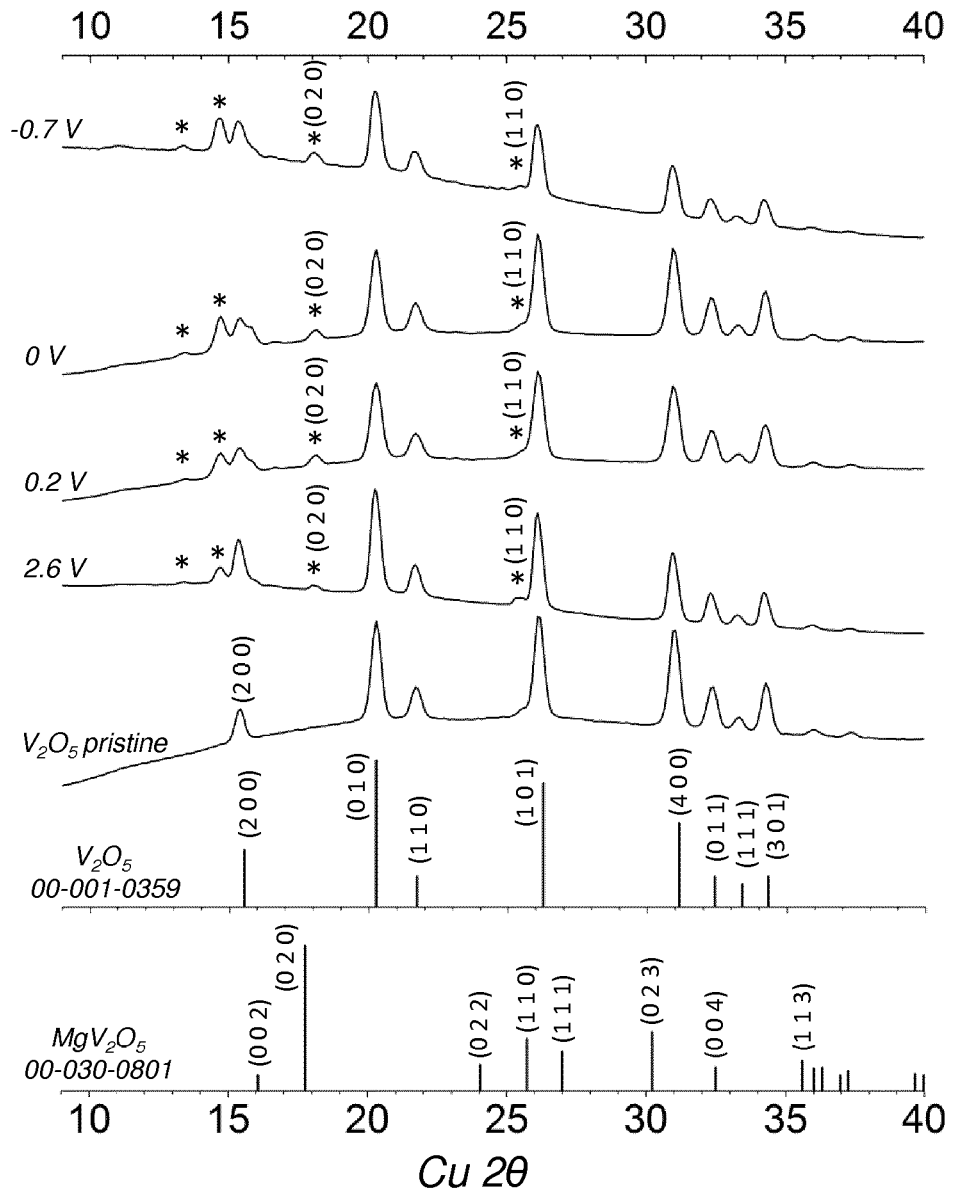
FIG. 4 is ex situ XRD patterns for orthorhombic $V_2O_5$ in pristine, discharged, and charged states, according to the exmaples.
Figure 7:
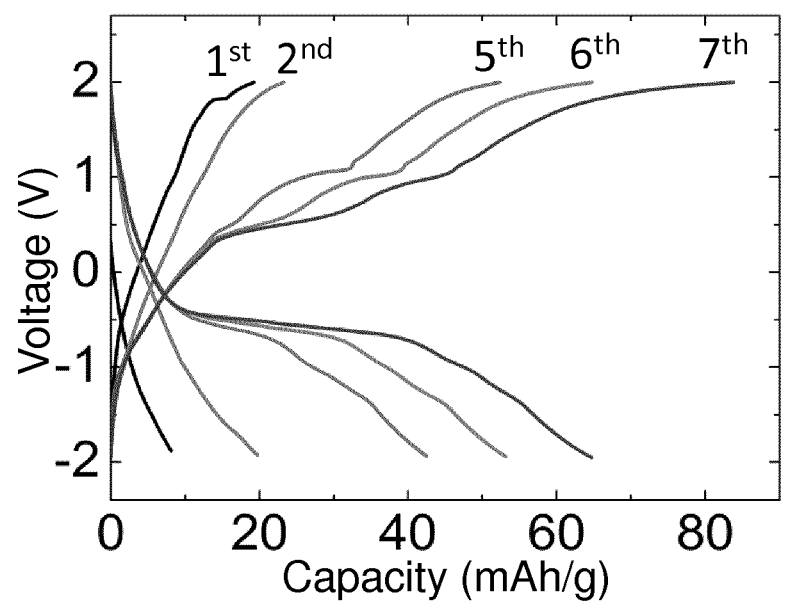
FIG. 7 illustrates coin cell cycling showing the performance of a $V_2O_5$ cathode in the 1.0 M $Mg(TFSI)_2$/DG electrolyte: the first 7 cycles of galvanostatic charge-discharge curves for $V_2O_5$ against a high surface area carbon counter electrode at a constant current of 20 µA, according to the exmaples.

To confirm Mg intercalation, the change of vanadium oxidation state was studied for pristine, charged, and discharged V$_2$O$_5$ using synchrotron-based ex-situ X-ray absorption near edge spectroscopy (XANES) in transmission mode. Normalized vanadium K edge spectroscopy and Fourier Transform (FT) of k$^2$-weighed spectroscopy is shown in FIG. 3. Vanadium metal foil was applied as an online reference for all measurements to check the monochromator energy calibration and full range XANES is shown in FIG. 7, showing good normalization. The edge position of the maximum in the first derivative was defined as 5465 eV. As expected, the shape of the spectra changed upon magnesium insertion. Discharged V$_2$O$_5$ shows a clear edge shift towards lower energy, 0.27 eV, indicating a partial reduction of the vanadium oxidation state upon magnesium intercalation. The energy of the pre-edge peak at the charged state was shifted back to higher energy, suggesting an increase of vanadium oxidation state and the reversibility of magnesium insertion. A reduction of pre-edge intensity for both charged and discharged states is possibly due to the distortion of the square pyramidal coordination of V$^{5+}$ with the nearby five oxygen atoms around the vanadium atom since pre-edge peaks is considered as the fingerprints to reflect the global symmetry around the vanadium ions. The edge position and intensity in the charged state did not completely recover back to the pristine state (0.06 eV difference) and is mainly ascribed to the incomplete extraction of magnesium, which is in agreement with the diffraction results. A structural analysis from k$^2$-weighted spectra reveals distortion of the V$_2$O$_5$ coordination environment due to the divalent Mg$^{2+}$ insertion. As a result, XAS evidenced that the V$_2$O$_5$ lattice structure remained after cycling, suggesting reaction during the intercalation. The vanadium oxygen bond length increases upon discharge To understand the structure change in V$_2$O$_5$ upon Mg intercalation, synchrotron x-ray diffraction was performed for orthorhombic V$_2$O$_5$ at pristine, charged, and discharged states at various potentials as shown in FIG. 4. Diffraction for the pristine electrode shows pattern peaks correspond to the orthorhombic V$_2$O$_5$ structure (Pmmn) Magnesium insertion into V$_2$O$_5$ takes place with formation of four new peaks, as indicated by the highlighted star signs in the diffraction peaks. The phase transitions are manifested and approved by the electrochemical response as two plateaus in cycling data or oxidation/reduction peaks observed from slow scan cyclic voltammogram. Upon discharge, increased Mg insertion leads to an increase of two peaks, peak (0 2 0) and (1 1 0), which correspond to MgV$_2$O$_5$ (Cmc2$_1$, ICSD 00-030-080) phase. New peaks at 14.711° and 13.399° (d spacing of 6.02 Å and 6.608 Å) correspond to unknown phases that are possibly from Mg$_x$V$_2$O$_5$ at low intercalation levels.

Based upon the above, intercalation of Mg into V$_2$O$_5$ has several interesting findings: partial intercalation of Mg is observed at about 0.25 mol Mg/V$_2$O$_5$, and Mg intercalated V$_2$O$_5$ is in equilibrium with the parent compound, V$_2$O$_5$, together with MgV$_2$O$_5$ with possibility of the existence of multiphase.

We have for the first time demonstrated a full cell Mg battery using a non-aqueous magnesium electrolyte, Mg(TFSI)$_2$/DG, that is compatible with both a high voltage V$_2$O$_5$ cathode (prepared from a sol-gel) and a magnesium metal anode. Electrochemical characterization suggests three promising characteristics for the Mg(TFSI)$_2$/DG electrolyte: (1) plating and stripping of Mg that can be achieved at a wide concentration range, from 0.1 M to 1.5 M; (2) anodic stability above 4.2 V versus Mg/Mg$^{2+}$, and (3) high ionic conductivity, up to 5.2 mS/cm. The Mg(TFSI)$_2$/DG electrolyte in this Mg full cell reflects a compromise between the intermediate Coulombic Efficiency at the magnesium metal anode and compatibility with a high voltage cathode. Approximately 0.2 Mg was inserted per formula unit into V$_2$O$_5$, based on the obtained discharge capacity as compared with the calculated theoretical capacity (SI). Furthermore, the intercalation of Mg into V$_2$O$_5$ leads to the formation of MgV$_2$O$_5$, as well as another unidentifiable phase.

A voltage vs. capacity curve for the V$_2$O$_5$/Mg cell is shown in FIG. 8a and FIG. 8b illustrates the capacity profile over cycling. The significance of this discovery is the compatibility of this electrolyte with a Mg$^0$ anode and a high voltage cathode.

While certain embodiments have been illustrated and described, it should be understood that changes and modifications may be made therein in accordance with ordinary skill in the art without departing from the technology in its broader aspects as defined in the following claims.

The embodiments, illustratively described herein may suitably be practiced in the absence of any element or elements, limitation or limitations, not specifically disclosed herein. Thus, for example, the terms "comprising," "including," "containing," etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the claimed technology. Additionally, the phrase "consisting essentially of" will be understood to include those elements specifically recited and those additional elements that do not materially affect the basic and novel characteristics of the claimed technology. The phrase "consisting of" excludes any element not specified.

The present disclosure is not to be limited in terms of the particular embodiments described in this application. Many modifications and variations may be made without departing from its spirit and scope, as will be apparent to those skilled in the art. Functionally equivalent methods and compositions within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can of course vary. It is also to be understood that the terminology used herein is for the purpose of describing particular embodiments only, and is not intended to be limiting.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, particularly in terms of providing a written description, all ranges disclosed herein also encompass any and all possible subranges and combinations of subranges thereof. Any listed range may be easily recognized as sufficiently describing and enabling the same range being broken down into at least equal halves, thirds, quarters, fifths, tenths, etc. As a non-limiting example, each range discussed herein may be readily broken down into a lower third, middle third and upper third, etc. As will also be understood by one skilled in the art all language such as "up to," "at least," "greater than," "less than," and the like, include the number recited and refer to ranges which may be subsequently broken down into subranges as discussed above. Finally, as will be understood by one skilled in the art, a range includes each individual member.

All publications, patent applications, issued patents, and other documents referred to in this specification are herein incorporated by reference as if each individual publication, patent application, issued patent, or other document was specifically and individually indicated to be incorporated by reference in its entirety. Definitions that are contained in text incorporated by reference are excluded to the extent that they contradict definitions in this disclosure.

Other embodiments are set forth in the following claims.

What is claimed is:

1. An electrochemical cell comprising:
a high voltage cathode configured to operate at 1.5 volts or greater;
an anode comprising $Mg^0$; and
an electrolyte comprising an ether solvent and a magnesium salt;
wherein:
a concentration of the magnesium salt in the ether is 1 M or greater; and
the magnesium salt comprises $Mg(CF_3SO_3)_2$; $Mg(CF_3SO_2)_2$; $Mg(C(CF_3SO_2)_3)_2$; $Mg(B(C_6F_5)_4)_2$; $Mg(B(C_6H_5)_4)_2$; $Mg(N(SO_2CF_2CF_3)_2)_2$; $Mg(BF_3C_2F_5)_2$; or $Mg(PF_3(CF_2CF_3)_3)_2$.

2. The electrochemical cell of claim 1, wherein the concentration of the magnesium salt in the ether is from 1 M to 4 M.

3. The electrochemical cell of claim 1, wherein the concentration of the magnesium salt in the ether is from 1 M to 2 M.

4. The electrochemical cell of claim 1, wherein the concentration of the magnesium salt in the ether is about 1.5 M.

5. The electrochemical cell of claim 1, wherein the cathode is configured to operate at 2 volts or greater.

6. The electrochemical cell of claim 1, wherein the cathode is configured to operate at 3 volts or greater.

7. The electrochemical cell of claim 1, wherein the cathode comprises a metal oxide.

8. The electrochemical cell of claim 1, wherein the cathode comprises $MnO_2$, $V_2O_5$, or $V_6O_{13}$.

9. The electrochemical cell of claim 1, wherein the ether solvent comprises tetrahydrofuran, 2-methyl tetrahydrofuran, dimethoxyethane, glyme, monoglyme, dimethyl glycol, ethylene glycol dimethyl ether, diethyl ether, ethyl glyme, diglyme, proglyme, ethyl diglyme, triglyme, butyl diglyme, tetraglyme, polyglyme, or higlyme.

10. The electrochemical cell of claim 1, wherein the ether solvent comprises diglyme, proglyme, ethyl diglyme, triglyme, butyl diglyme, tetraglyme, polyglyme, or higlyme.

11. An electrochemical cell comprising:
a high voltage cathode configured to operate at 1.5 volts or greater, the high voltage cathode comprising $MnO_2$, $V_2O_5$, or $V_6O_{13}$;
an anode comprising $Mg^0$; and
an electrolyte comprising an ether solvent and a magnesium salt;
wherein:
the electrochemical cell is void of a Grignard electrolyte;
a concentration of the magnesium salt in the ether is 1 M or greater; and
the magnesium salt comprises $Mg[B(C_2O_4)_2]_2$; $Mg[BF_2(C_2O_4)]_2$; $Mg(ClO_4)_2$, $Mg(BF_4)_2$; $Mg(PF_6)_2$; $Mg(AsF_6)_2$; $Mg(SbF_6)_2$; $MgBr_2$; $Mg(CF_3SO_3)_2$; $Mg(CF_3SO_2)_2$; $Mg(C(CF_3SO_2)_3)_2$; $Mg(B(C_6F_5)_4)_2$; $Mg(B(C_6H_5)_4)_2$; $Mg(N(SO_2CF_2CF_3)_2)_2$; $Mg(N(SO_2C_2F_5)_2)_2$; $Mg(BF_3C_2F_5)_2$; or $Mg(PF_3(CF_2CF_3)_3)_2$.

12. The electrochemical cell of claim 11, wherein the concentration of the magnesium salt in the ether is from 1 M to 4 M.

13. The electrochemical cell of claim 11, wherein the magnesium salt comprises $Mg(CF_3SO_3)_2$; $Mg(CF_3SO_2)_2$;— $Mg(C(CF_3SO_2)_3)_2$; $Mg(B(C_6F_5)_4)_2$; $Mg(B(C_6H_5)_4)_2$; $Mg(N(SO_2CF_2CF_3)_2)_2$; $Mg(BF_3C_2F_5)_2$; or $Mg(PF_3(CF_2CF_3)_3)_2$.

14. The electrochemical cell of claim 1, wherein the ether solvent consists of diglyme.

15. The electrochemical cell of claim 1, wherein the electrochemical cell is void of a Grignard reagent.

* * * * *